United States Patent [19]

Speer et al.

[11] Patent Number: 5,252,125
[45] Date of Patent: * Oct. 12, 1993

[54] INCLUSION PIGMENTS OF ZIRCONIUM SILICATE FORMED WITH SPINEL INCLUSIONS, A PROCESS FOR THE PREPARATION AND USE THEREOF

[75] Inventors: Dietrich Speer, Hanau; Akos Kiss, Alzenau-Wasserlos; Peter Kleinschmit, Hanau; Christel Zell, Rodenbach, all of Fed. Rep. of Germany

[73] Assignee: Degussa Aktiengesellschaft, Frankfurt am Main, Fed. Rep. of Germany

[*] Notice: The portion of the term of this patent subsequent to Jul. 30, 2008 has been disclaimed.

[21] Appl. No.: 847,493

[22] Filed: Mar. 12, 1992

[30] Foreign Application Priority Data

Mar. 16, 1991 [DE] Fed. Rep. of Germany ....... 4108623

[51] Int. Cl.$^5$ ............................ C08K 3/10; C09C 1/34
[52] U.S. Cl. ...................................... 106/450; 106/454; 106/456; 106/457; 106/480; 106/903
[58] Field of Search ................ 427/215, 218; 106/400, 106/450, 454, 456, 480, 483, 903

[56] References Cited

U.S. PATENT DOCUMENTS

| | | | |
|---|---|---|---|
| 4,696,700 | 9/1987 | Fischer et al. | 106/453 |
| 4,874,433 | 10/1989 | Kiss et al. | 106/450 |
| 5,008,223 | 4/1991 | Speer et al. | 106/450 |
| 5,019,169 | 5/1991 | Speer et al. | 106/438 |
| 5,021,092 | 6/1991 | Speer et al. | 106/451 |
| 5,035,746 | 7/1991 | Speer et al. | 106/438 |
| 5,043,016 | 8/1991 | Speer et al. | 106/450 |
| 5,080,718 | 1/1992 | Sullivan et al. | 106/456 |

FOREIGN PATENT DOCUMENTS

| | | |
|---|---|---|
| 0074779 | 3/1983 | European Pat. Off. . |
| 0455933 | 11/1991 | European Pat. Off. . |
| 2312535 | 11/1973 | Fed. Rep. of Germany . |
| 3719051 | 11/1988 | Fed. Rep. of Germany . |
| 3827068 | 3/1990 | Fed. Rep. of Germany . |
| 3906821 | 3/1990 | Fed. Rep. of Germany . |
| 3906818 | 9/1990 | Fed. Rep. of Germany . |
| 3906819 | 9/1990 | Fed. Rep. of Germany . |
| 3931092 | 3/1991 | Fed. Rep. of Germany . |
| 4002564 | 8/1991 | Fed. Rep. of Germany . |

OTHER PUBLICATIONS

Van Arno Broll et al., Chemiker Zeitung, vol. 101, Jul./Aug. 1977, pp. 319-323.

B. Camera et al., "Keramische Farbkoerper und deren Verwendung," *Sprechsaal*, vol. 115, No. 1, 1982 pp. 43–46.

J. Rotsche, "Kermische Farkoerper auf der Basis von Zirkoniumsilikat," *Silikattechnik*, vol. 37 1986, pp. 350-352.

European Search Report dated Feb. 5, 1993.

*Primary Examiner*—Mark L. Bell
*Assistant Examiner*—Michael A. Marcheschi
*Attorney, Agent, or Firm*—Beveridge, DeGrandi, Weilacher & Young

[57] ABSTRACT

Inclusion pigments are disclosed based on zirconium silicate as a casing component and cobalt-free spinels as discrete, included colored compounds. The inclusion pigments are prepared by fusing a mixture of a zirconium dioxide source, a silicon dioxide source, one or more mineralizer and cobalt-free oxides in a ratio suitable for spinel-formation. The inclusion pigments have high enamel-fastness and high color-fastness. Further, the pigments are drain-resistant under usual decoration firing conditions.

6 Claims, No Drawings

INCLUSION PIGMENTS OF ZIRCONIUM SILICATE FORMED WITH SPINEL INCLUSIONS, A PROCESS FOR THE PREPARATION AND USE THEREOF

BACKGROUND OF THE INVENTION

This invention relates to inclusion pigments based on zirconium silicate as a casing component and cobalt-free spinels as discrete included colored compounds. The invention also relates to a process for the preparation of the inclusion pigments and the use thereof.

Colored substances of the spinel type such as $CoAl_2O_4$, $CuCr_2O_4$, and $ZnFe_2O_4$ have been known for a long time. They are known for their often brilliant colors. Such substances have been used for the coloration of enamels and as a component of decorating colors. Although certain color pigments of the spinel type keep their color to a very high extent, when subjected to the effect of an aggressive glass flow, other spinels, particularly iron-containing spinels, show undesirable changes in color when used in enamels. Most spinels show the disadvantage of the so-called "drain effect." As a result of an interaction between the pigment and the glass flow, the pigment is dissolved to a lesser or greater extent; i.e., components of the pigment migrate into the surrounding glass flow and optionally color the surrounding glass. This "drain effect" inhibits the preparation of decorations having sharp contours or distinct color separation.

In order to increase the stability of color pigments during the fusing and/or firing of ceramic decorations, certain coloring agents have been included in transparent crystals of enamel-stable substances, as described in German Patent Application No. DE-AS 23 12 535, which is entirely incorporated herein by reference. Zirconium silicate is particularly suitable for use as a casing component which includes the colorizing pigment. The formation of zirconium silicate and the inclusion of the coloring particles generally take place in a solid phase reaction at a temperature between 750° C. and 1400° C., by using a silicon dioxide source and a zirconium dioxide source, preferably directly $SiO_2$ and $ZrO_2$, in the presence of a mineralizator. According to the process disclosed in DE-AS 23 12 535, it is not possible to include all conceivable coloring compounds during the formation of the zirconium silicate casing component in an amount required to exert the pigment effect. The coloring components and the pre-products thereof can often retard or prevent the formation of $ZrSiO_4$ from $SiO_2$ and $ZrO_2$, or the coloring compounds may not even be included, and for this reason, the desired pigment properties can not be achieved.

In DE-AS 23 12 535, an experiment is described wherein a light blue inclusion pigment is obtained from $SiO_2$, $ZrO_2$ and Thenardblue, a spinel of the formula $CoAl_2O_4$. It has been found that Cobalt-containing spinels of the formulae $CoAl_2O_4$, $CoFe_2O_4$, $CoCr_2O_4$ can be included by the preparation of inclusion pigments into the zirconium silicate casing component either not at all, or only to a very limited extent. This relates to such cobaltcontaining spinels per se and to those formed by the in situ formation of spinels from CoO and $Al_2O_3$, $Fe_2O_3$ and $Cr_2O_3$, respectively. When using the pigments thus obtained as decorating colors, significant traces and drain appear in the course of firing. The drain is believed to be due to the fact that cobalt is set free in the enamel.

SUMMARY OF THE INVENTION

There is a particular demand for broadening the palette of pigments based on zirconium silicate; see, for example, Chemiker Zeitung 101 (1977), pgs. 319–323; DE-OS 37 19 051; DE-OS 39 06 818; DE-OS 39 06 819 and DE-OS 39 06 821, which references are entirely incorporated herein by reference. DE-OS 39 06 818, DE-OS 39 06 819 and DE-OS 39 06 821 correspond to U.S. Pat. Nos. 5,008,223, 5,019,169 and 5,035,746, respectively, each of which are also entirely incorporated herein by reference. There are several requirements for such pigments. For example, any toxic heavy metals which are present should not be set free from the $ZrSiO_4$ crystals; during the firing of the enamel, no drain and no color changes should take place, or at least the drain and color change should be minimized. A restriction to zirconium silicate as the casing component would have the advantage in that during the decoration procedure (e.g., by screen printing), a single adapting medium could be used for all pigments. Since the palette is limited to black, gray and brown shades of color, it is an object of the present invention to provide such pigments in the form of zirconium silicate inclusion pigments.

It is a further requirement that the inclusion pigments should be available in highly intensive colors and should be substantially free of coloring compounds which are not included at all or which are included only to an incomplete extent. A further object of the present invention is to prepare pigments whereby it is not necessary to separate the non-included coloring compounds.

The present invention relates to inclusion pigments based on zirconium silicate as a casing component and spinels as discrete included colored compounds, wherein the included spinels are cobalt-free.

The included spinels of the present invention correspond to the formula $AB_2O_4$, wherein A represents a bivalent metal ion and B represent a trivalent metal ion or vice versa. The bivalent metal ion preferably may be Ni, Zn, Mg, Mn and Fe. The trivalent metal ion preferably may be Al, Cr, Fe and Mn. The inclusion pigments according to the present invention are black, gray or brown and possess the required color stability and drain resistance. Preferred pigments include aluminum-free spinels, and particularly preferred pigments are iron-containing spinels, such as, $ZnFe_2O_4$, $NiFe_2O_4$, $(Fe,Cr)_3O_4$ and $Fe(Fe,Cr)_2O_4$.

DETAILED DESCRIPTION OF THE INVENTION

The inclusion pigments based on zirconium silicate as the casing component and spinels as the discrete included compound can be prepared by fusing a mixture of a zirconium dioxide source, such as, $ZrO_2$ or zirconyl oxide hydrate; and a silicon dioxide source, such as, $SiO_2$, zeolites rich in $SiO_2$, alkoxy silanes or alkoxy siloxanes. The mixture most preferably includes a molar ratio of the zirconium dioxide source and the silicon dioxide source which corresponds to the formation of $ZrSiO_4$, together with raw materials of the colored compounds to be included and conventional mineralizers. The temperature at mixing is in the range of about 800° C. to 1300° C., for a period of about 0.5 to 8 hours, and, if necessary, grinding the fused product to the desired particle size.

The fusing procedure can be carried out in the presence of a reducing agent, but preferably, the process is preformed under oxidizing conditions. As a raw material of the colored compound to be included, cobalt-free oxides or preproducts of such oxides (e.g. hydroxides or carbonates) can be used in a spinel forming composition ratio.

According to a preferred embodiment of the present invention, the spinel forming oxides have an average particle diameter $D_{50}$ value, determined by laser-diffraction, of less than 2 μm. The mixture to be fused contains preferably 10–20% (by weight) of spinel forming oxides. As the $ZrSiO_4$ raw material, preferably $ZrO_2$ and $SiO_2$ are used. It is particularly preferred to use $ZrO_2$ and $SiO_2$ having an average particle diameter in the range of about 1 to 10 μm.

As the mineralizers preferably halogenides, particularly fluorides and chlorides of alkali and/or alkaline earth metals and alkalisilicofluroides can be used. After the fusing procedure, the fused product is ground in a usual manner and, if desired, subjected to a wet treatment in order to remove the mineralizators.

The spinal-containing inclusion pigments according to the present invention generally have a $D_{50}$ value in the range of from above 2 to 20 μm, particularly preferred is the range of 8–15 μm. These inclusion pigments are particularly suitable for use in color varnishes, enamels, decoration colors and for ceramic decorations which do not change their color on firing and which do not drain. The inclusion pigments of the present invention can be used in other substrates as well, for example, plastics, lacquers, varnishes and pressed colors. These pigments can be used in any conventionally known manner to color materials, such as by means of conventional pressing methods, for example, by direct pressing, such as by tampon pressing or by sieve pressing; or by indirect pressing, such as by stripping forming means. Such application techniques are well known to those skilled in the art.

Preferred inclusion pigments are characterized by a narrow particle size range, preferably wherein not more than 5% of the particles are below 3 μm or above 20 μm. The inclusion pigments in accordance with the present invention are highly color-fast and enamel-fast under usual decoration firing conditions, are drain-resistant, and are not harmful to the environment.

In view of the fact that until now it was not possible to prepare suitable $ZrSiO_4$ inclusion pigments with included cobalt-containing spinels, it is unexpected and unforseeable that other spinels, particularly iron-containing spinels, can be safely included into a zirconium silicate casing, if the spinel is formed from suitable raw materials in situ only during the formation of the inclusion pigment.

In a surprising manner, the overwhelming portion of the in situ formed spinels are included, and for this reason, the known drawbacks of the non-included spinels are eliminated. No separate step is needed to remove the non-included spinels.

The invention will now be described in conjunction with various specific examples. These examples are provided to describe exemplary embodiments of the invention and should not be construed as limiting the invention.

EXAMPLE 1

A mixture including:

51.4 $ZrO_2$
20.0 g $SiO_2$
9.6 g $Fe_2O_3$
4.8 g ZnO
6.6 g KCl
4.8 g $MgF_2$ and
2.8 g $Na_2SiF_6$ is prepared by admixing the above components in a Bloch-Rosetti ball mill for 20 minutes. The fusing procedure is carried out at 1100° C. for 2 hours in a covered chamotte crucible in an electric chamber oven. The fused product is ground. In the beige-brown pigment thus obtained, the included coloring $ZnFe_2O_4$ spinels can be detected by means of X-ray diffractometry.

To allow for a comparison with non-included $ZnFe_2O_4$ spinels, a decoration with the inclusion pigment prepared as described above is overcoated with an enamel of the following composition: 40% by weight of PbO, 40% by weight of $SiO_2$, 7% by weight $Al_2O_3$, 6% by weight of $B_2O_3$, 5% by weight of CaO, and 2% by weight of $K_2O$. The overcoated decoration is tested in a firing test. As the comparative example, equivalent amounts of the pigment related to the above-identified spinels are applied with the aid of a usual adapting medium (ratio by weight 8:2) by screen pressing onto a ceramic carrier, overcoated with the above-identified enamel and fired onto the ceramic at a temperature of 1050° C.

The decoration coated with the inclusion pigment shows sharp contours and maintains its original color (L=61, a=16, b=28, as measured according DIN 5033 in a CIE-Lab-System). On the other hand, the decoration prepared with the non-included spinel becomes almost unrecognizable; the color changes from beige-brown to a dirty Yellow-brown.

EXAMPLE 2

A mixture according to Example 1 is used, except that the ZnO in the mixture is replaced with 4.8 g of NiO. A reddish-brown inclusion pigment is obtained in which $NiFe_2O_4$ spinels are detected by X-ray-diffractometry.

According to the method described in Example 1, the color values for the inclusion pigment according to DIN 5033 are as follows: L=28, a=11, b=14.

Upon testing the non-included spinels in a comparative example, Fe- and Ni-ions are set free and the color turns to a Yellow-olive-brown.

EXAMPLE 3

A mixture according to Example 1 is prepared except that the ZnO in the mixture is replaced by 4.8 g of $Cr_2O_3$. A black, drain-fast inclusion pigment is obtained. By using identical spinel concentrations in the decoration, the pigment according to Example 3 shows a higher color-intensity than the pigment containing a non-included spinel.

While the invention has been described in conjunction with various particular embodiments, it is understood by those skilled in the art that various modifications may be made without departing from the spirit and scope of the invention as defined in the claims.

The priority document, German Patent Application No. P 41 08 623.6, filed in Germany on Mar. 16, 1991, is relied on and entirely incorporated herein by reference.

We claim:

1. An inclusion pigment, comprising: a zirconium silicate casing component and a spinel as a discrete included colored compound, wherein the spinels are cobalt-free.

2. The inclusion pigment according to claim 1, wherein the spinel contains iron.

3. The inclusion pigment according to claim 2, wherein the spinel is selected from the group consisting of $ZnFe_2O_4$, $NiFe_2O_4$, $(Fe,Cr)_3O_4$ or $Fe(Fe,Cr)_2O_4$.

4. A process for preparing an inclusion pigment, having zirconium silicate as casing component and a spinel as a discrete included colored compound, comprising: fusing a mixture of a zirconium dioxide source and a silicon dioxide source to form $ZrSiO_4$, the mixture further including raw materials of the colored compound to be included and at least one mineralizers, wherein the fusing takes place at a temperature in the range of about 800° C. to 1300° C. for a period in the range of about 0.5 to 8 hours, wherein the raw materials for the colored compound to be included are cobalt-free oxides or precursors thereof, of a fine particle size, present in a spinel forming ratio.

5. The process according to claim 4, wherein $ZrO_2$ is used as the zirconium dioxide source, $SiO_2$ is used as the silicon dioxide source, whereby the raw materials have an average particle diameter below 2 $\mu$m.

6. The process according to claim 4, wherein the zirconium dioxide source and the silicon dioxide source include $ZrO_2$ and $SiO_2$ in a molar ratio which corresponds to the formation of $ZrSiO_4$.

* * * * *